(12) United States Patent
Rinda

(10) Patent No.: US 10,435,101 B2
(45) Date of Patent: Oct. 8, 2019

(54) MOTORCYCLE RETRACTABLE TOP

(71) Applicant: Komasato Rinda, Kaohsiung (TW)

(72) Inventor: Komasato Rinda, Kaohsiung (TW)

(73) Assignee: ADIVA Co., Ltd., Kaohsiung (TW)

( * ) Notice: Subject to any disclaimer, the term of this patent is extended or adjusted under 35 U.S.C. 154(b) by 34 days.

(21) Appl. No.: 15/854,775

(22) Filed: Dec. 27, 2017

(65) Prior Publication Data
US 2018/0118296 A1   May 3, 2018

(51) Int. Cl.
*B62J 17/08*        (2006.01)
*B62K 19/46*       (2006.01)

(52) U.S. Cl.
CPC .............. *B62J 17/08* (2013.01); *B62K 19/46* (2013.01); *B62J 2017/086* (2013.01); *B62K 2202/00* (2013.01)

(58) Field of Classification Search
CPC ..... B62J 17/08; B62J 2017/086; B62K 19/46; B62K 2202/00
See application file for complete search history.

(56) References Cited

U.S. PATENT DOCUMENTS

2006/0244284 A1* 11/2006 Solo ................. B60J 7/145
296/107.01

* cited by examiner

*Primary Examiner* — D Glenn Dayoan
*Assistant Examiner* — Melissa A Black

(57) ABSTRACT

A retractable top for a motorcycle including a windshield and a storage compartment, the retractable top is provided with at least one hinge secured to the storage compartment, at least one folding member for pivotably securing a front section of the retractable top to an adjacent section of the retractable top, and at least one buckle for securing the front section of the retractable top to the windshield. Each buckle includes a first hook disposed on an inner surface of the windshield, a pivotal loop configured to place on the first hook, a second hook disposed on an inner surface of the front section of the retractable top, and a third hook pivotably secured to the pivotal loop and configured to secure to the second hook. The retractable top and the windshield are configured to releasably fasten together.

2 Claims, 6 Drawing Sheets

MOTORCYCLE RETRACTABLE TOP

BACKGROUND OF THE INVENTION

1. Field of the Invention

The invention relates to a protective top for a motorcycle rider and more particularly to a retractable top for a motorcycle.

2. Description of Related Art

A motorcycle operator is usually exposed to the elements. Covers have been devised for the motorcycles, but they all suffer from deficiencies which limit their usefulness.

There is a conventional top for a motorcycle. However, the top is rigid and thus it may occupy a great space if the motorcycle is not in use.

Thus, the need for improvement still exists.

SUMMARY OF THE INVENTION

It is therefore one object of the invention to provide a retractable top for a motorcycle including a windshield and a storage compartment, the retractable top comprising at least one hinge secured to the storage compartment, at least one folding member for pivotably securing a front section of the retractable top to an adjacent section of the retractable top, and at least one buckle for securing the front section of the retractable top to the windshield; wherein each of the at least one buckle comprises a first hook disposed on an inner surface of the windshield, a pivotal loop configured to place on the first hook, a second hook disposed on an inner surface of the front section of the retractable top, and a third hook pivotably secured to the pivotal loop and configured to secure to the second hook; and wherein the retractable top and the windshield are configured to releasably fasten together.

The above and other objects, features and advantages of the invention will become apparent from the following detailed description taken with the accompanying drawings.

DETAILED DESCRIPTION OF THE INVENTION

Figure 1:
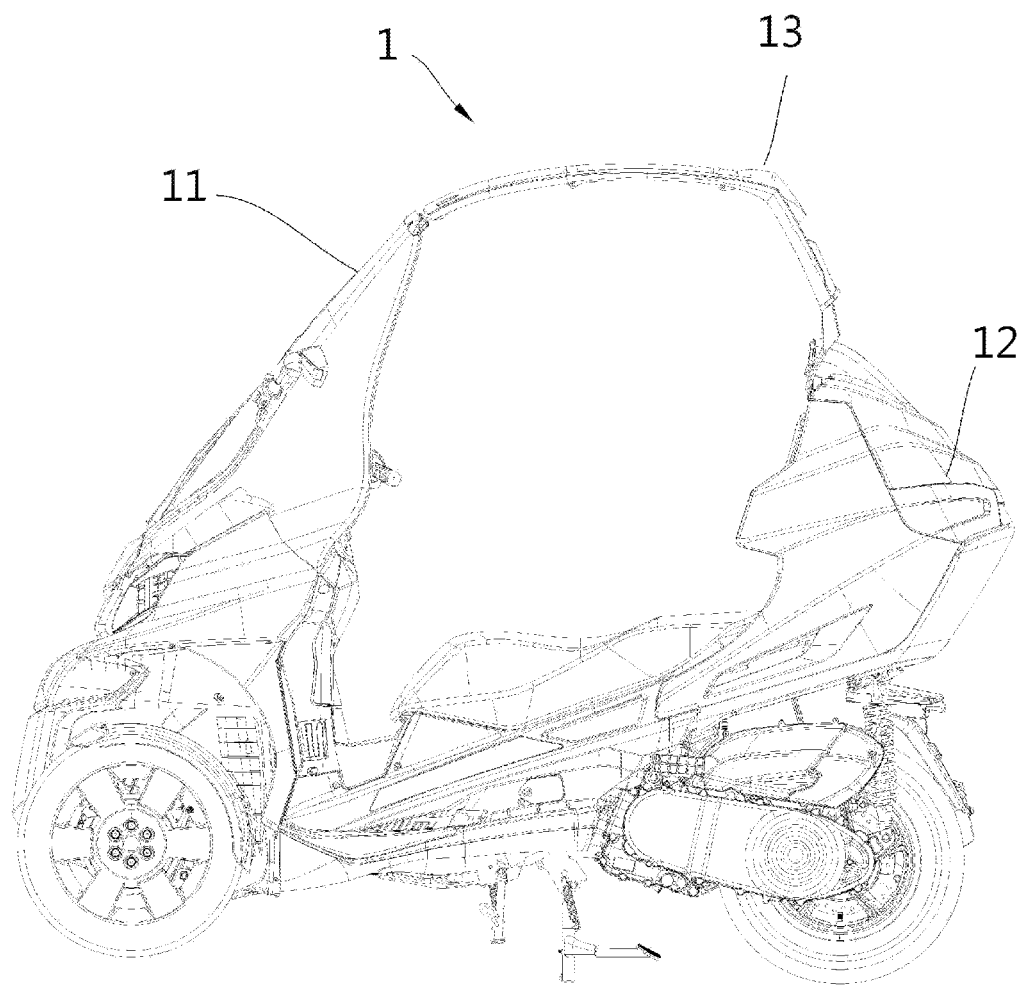
FIG. 1 is a side elevation of a motorcycle incorporating a retractable top according to the invention.
Figure 2:
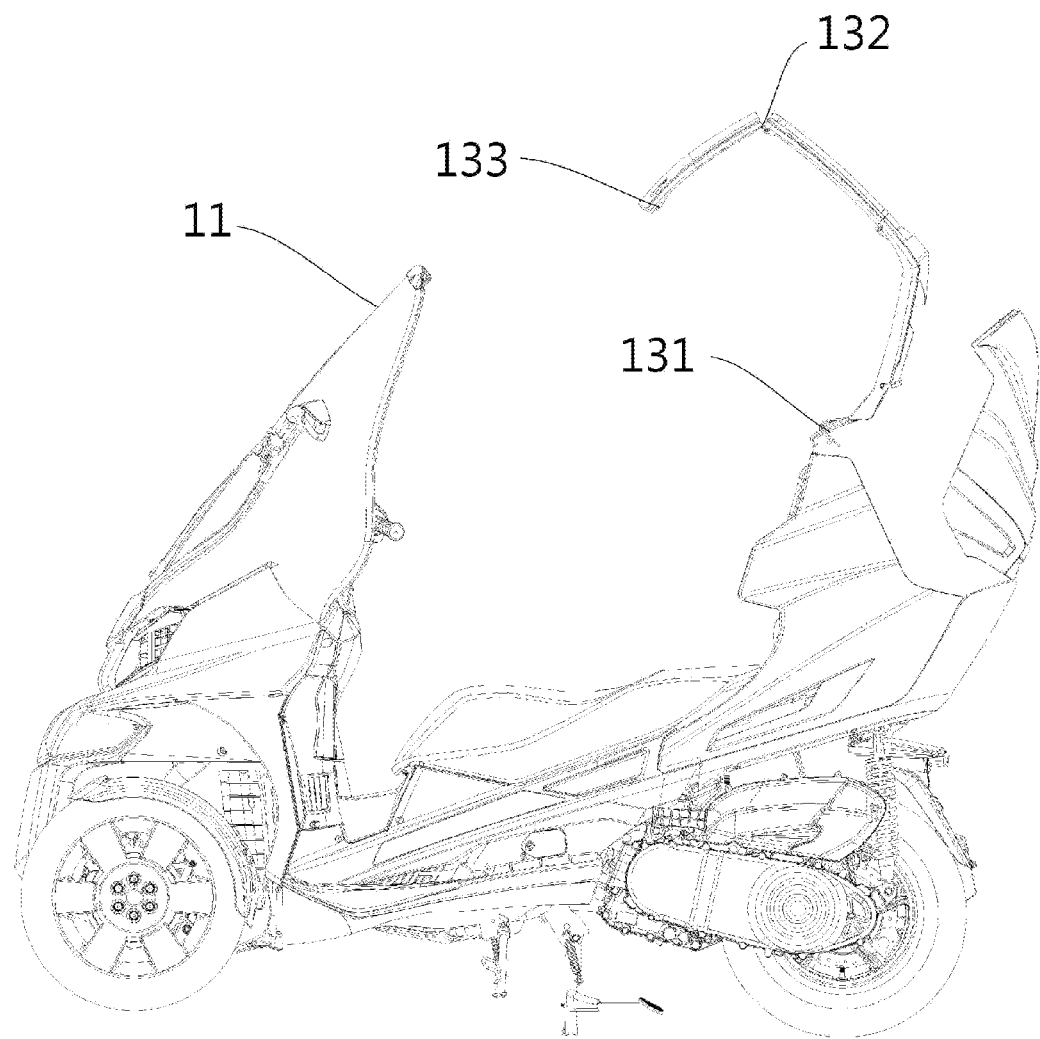
FIG. 2 is a view similar to FIG. 1 with the top open.
Figure 3:
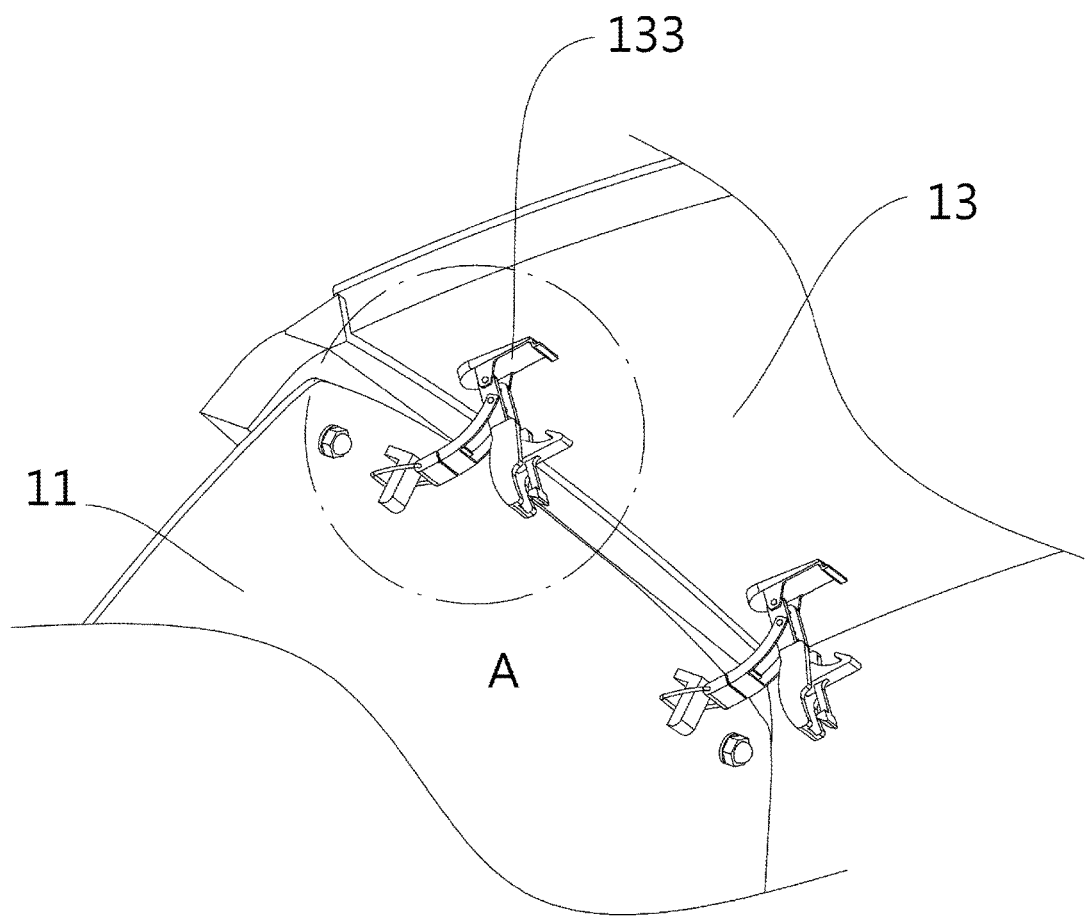
FIG. 3 is a perspective view showing the top and the windshield to be secured together.
Figure 4:
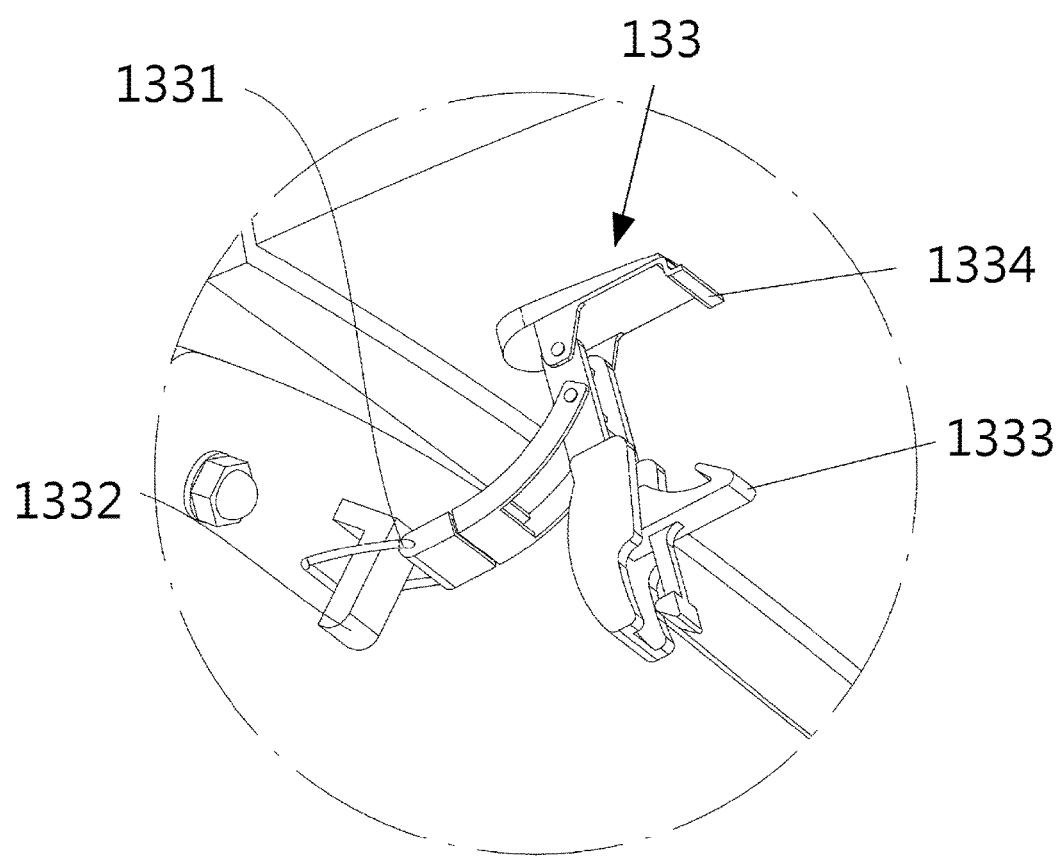
FIG. 4 is a detailed view of the area A in FIG. 3.
Figure 5A:
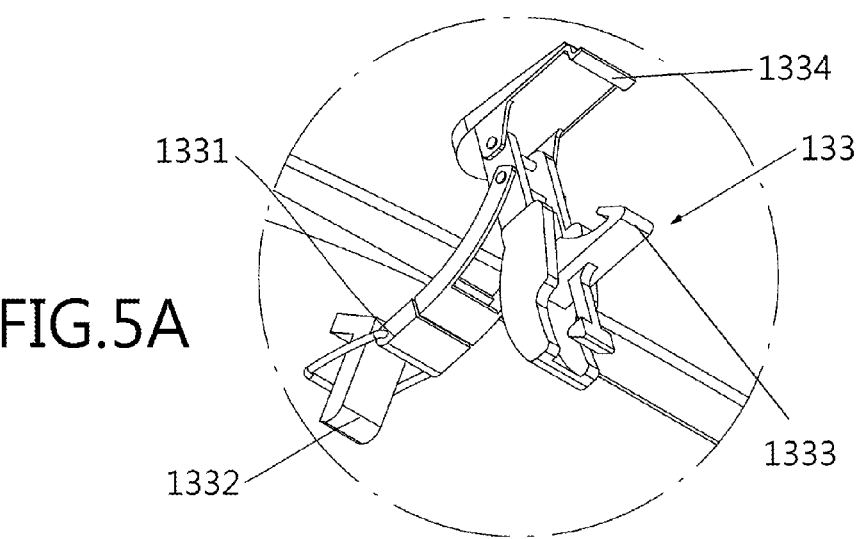
FIG. 5A is a reproduction of FIG. 4 but in a smaller scale.
Figure 5B:
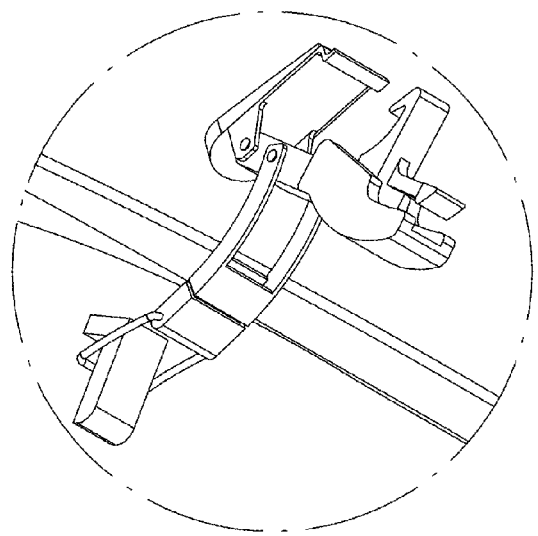
FIG. 5B is a view similar to FIG. 5A showing the windshield and the top in a further step of being secured together.
Figure 5C:
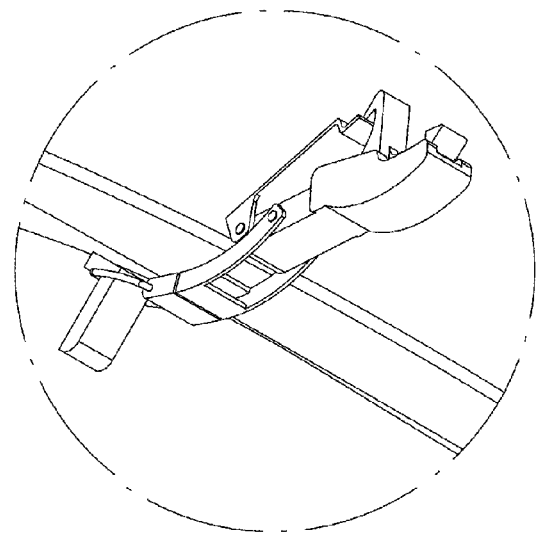
FIG. 5C is a view similar to FIG. 5B showing the windshield and the top secured together.
Figure 6A:
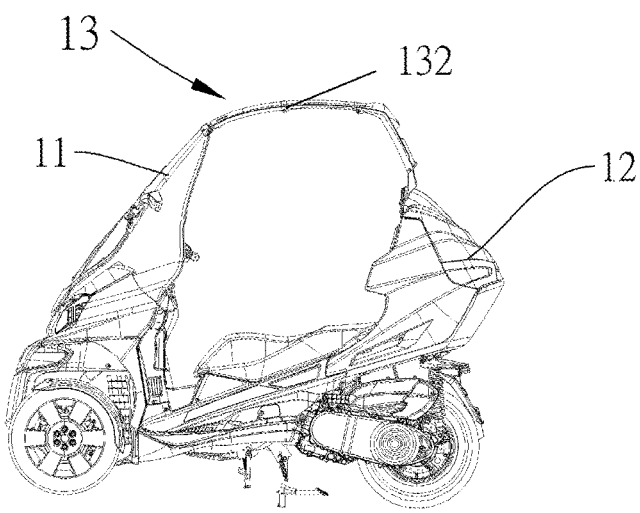
FIGS. 6A, 6B and 6C show steps of retracting the top into the storage compartment.
Figure 6B:
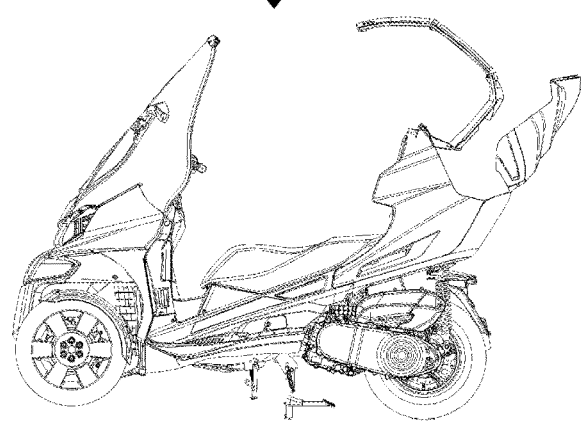
Figure 6C:
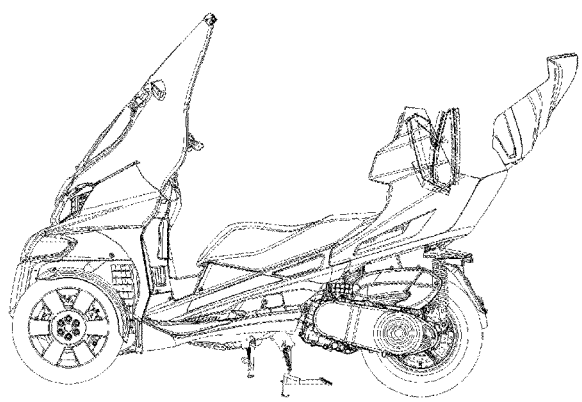

Referring to FIGS. 1 to 6C, a motorcycle 1 of the invention comprises a windshield 11, a storage compartment 12, and a retractable top 13.

The retractable top 13, as the subject of the invention, comprises two hinges 131 secured to the storage compartment 12, two folding members 132 for pivotably securing a front section of the top 13 to an adjacent section of the top 13, and two buckles 133 for securing the front section of the top 13 to the windshield 11.

It is noted that the folding members 132 are incorporated into a retractable top 132A in the embodiment and has at least one fold. There is further provided an adjustment member (not shown) on the retractable top 132A for elastically adjusting a folding angle of the folded portion of the retractable top 132A. The folded retractable top 132A can be disposed in the storage compartment 12. Thus, a rider may adjust a distance between the seat and the top 13 by accommodating to requirements or the rider's body.

The buckle 133 comprises a first hook 1332 provided on an inner surface of the windshield 11, a pivotal loop 1331 configured to put on the first hook 1332, a second hook 1334 provided on an inner surface of the front section of the top 13, and a third hook 1333 pivotably secured to the pivotal loop 1331 and configured to secure to the second hook 1334. A rider may manipulate both the pivotal loops 1331 and the third hooks 1333 to fasten the top 13 and the windshield 11 together in a ready to use state or disengage the top 13 from the windshield 11 prior to retracting the top 13 into the storage compartment 12.

Consequently, for extending the top 13, a rider may pull the folding members 132 and extend same. The folding members 132 are incorporated into a retractable top 132A. After extending the folding members 132, the rider may put the pivotal loop 1331 on the first hook 1332 and press the pivotal loop 1331 to fasten them together.

After being fastened, the folding members 132 are disposed above the seat to protect the rider from being adversely affected by weather. For example, the rider is protected from rain or protected from objects falling above. It has excellent protection. Further, the rider may unfasten the buckle 133 (see FIGS. 5A-6C), fold the folding members 132, and store the folded folding members 132 in the storage compartment 12. It is envisaged that the invention implements a simple operation to either fold the top 13 or extend same for protecting the rider. Further, the storage is very convenient. The storage compartment 12 is formed integrally with the motorcycle frame. Thus, the storage of the top 13 in the storage compartment 12 can be implemented without detaching the motorcycle components.

In view of above description, the retractable top of the motorcycle of the invention has the following advantages in comparison with the that of the conventional art:

1) The rider is protected from both rain and objects falling above due to the provision of the top. The top has excellent protection.

2) The invention implements a simple operation to either fold the top or extend same for protecting the rider.

3) The top of the invention can be folded prior to storing in the storage compartment. It is easy to store without occupying space reserved for rider.

4) Adjustment member is provided in the retractable top of the invention so as to flexibly adjust a distance between the retractable top and the seat. Therefore, an optimum and flexible riding space is provided for the rider.

While the invention has been described in terms of preferred embodiments, those skilled in the art will recognize that the invention can be practiced with modifications within the spirit and scope of the appended claims.

What is claimed is:

1. A top assembly for a motorcycle comprising:
a windshield provided on a front end of the motorcycle;

a storage compartment provided on a rear end of the motorcycle; and a top provided in the storage compartment and connected to the windshield;

wherein the top is configured to store in the storage compartment;

wherein the top comprises a hinge secured to the storage compartment, a folding member secured to the hinge, and a buckle for securing a front section of the top to the windshield;

wherein the buckle comprises a first hook provided on an inner surface of the windshield, and a pivotal loop configured to put on the first hook;

wherein the first hook is provided on a top of the windshield;

wherein the top is retractable and configured to fold at least one fold; and wherein the retractable to is provided in the storage compartment after being folded.

2. The retractable top assembly of claim 1, further comprising an adjustment member on the retractable top for elastically adjusting a folding angle of the folded portion of the retractable top.

\* \* \* \* \*